(12) United States Patent
Masunishi et al.

(10) Patent No.: US 8,873,218 B2
(45) Date of Patent: Oct. 28, 2014

(54) ACTUATOR

(75) Inventors: Kei Masunishi, Kanagawa-ken (JP);
Tamio Ikehashi, Kanagawa-ken (JP);
Yasushi Tomizawa, Tokyo (JP); Akihiro Koga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 13/070,250

(22) Filed: Mar. 23, 2011

(65) Prior Publication Data
US 2012/0073940 A1 Mar. 29, 2012

(30) Foreign Application Priority Data
Sep. 24, 2010 (JP) .................. 2010-213449

(51) Int. Cl.
*H01G 5/00* (2006.01)
*H01G 4/005* (2006.01)
*H01H 59/00* (2006.01)
*H01G 5/18* (2006.01)

(52) U.S. Cl.
CPC ............. *H01H 59/0009* (2013.01); *H01G 5/18* (2013.01)
USPC .......................................... 361/277; 361/303

(58) Field of Classification Search
CPC .................................. H01G 5/16; H01G 5/18
USPC .................................................. 361/277, 303
See application file for complete search history.

(56) References Cited

U.S. PATENT DOCUMENTS

| | | | |
|---|---|---|---|
| 7,751,173 B2 | 7/2010 | Ikehashi et al. | |
| 7,885,051 B2 | 2/2011 | Ikehashi et al. | |
| 8,035,949 B2 * | 10/2011 | Miyano | 361/271 |
| 8,564,928 B2 * | 10/2013 | Ikehashi et al. | 361/290 |
| 2011/0063773 A1 * | 3/2011 | Ikehashi | 361/277 |
| 2011/0063774 A1 | 3/2011 | Ikehashi et al. | |

FOREIGN PATENT DOCUMENTS

| | | |
|---|---|---|
| JP | 2006-286540 | 10/2006 |
| JP | 2008-67549 | 3/2008 |
| JP | 2009-201317 | 9/2009 |
| JP | 2010-135634 | 6/2010 |
| JP | 2010-199246 | 9/2010 |

OTHER PUBLICATIONS

Van-Gils et al.; "Evaluation of Creep in RF MEMS Devices", Thermal, Mechanical and Multi-Physics Simulation Experiments in Microelectronics and Micro-Systems, Euro Sime 2007, International Conference, 6 sheets, (2007).

Notification of Reason(s) for Refusal issued by the Japanese Patent Office on Aug. 16, 2012, for Japanese Patent Application No. 2010-213449, and English-language translation thereof.

* cited by examiner

*Primary Examiner* — Eric Thomas
(74) *Attorney, Agent, or Firm* — Finnegan, Henderson, Farabow, Garrett & Dunner, L.L.P.

(57) ABSTRACT

According to one embodiment, an actuator includes a substrate, a lower electrode disposed on the substrate, an upper electrode, a support and a driving unit. The upper electrode is opposed to the lower electrode. The support supports the upper electrode. The driving unit is connected between the lower electrode and the upper electrode and feeds a driving voltage. The driving voltage at which the lower and upper electrodes start to come into contact with each other is defined as a pull-in voltage. A capacitance between the lower and upper electrodes is defined as a pull-in capacitance. There exist a first region and a second region. In the second region, a change rate of a capacitance ratio changes more slowly than in the first region, when the absolute value of the potential difference is further increased. The driving unit feeds the driving voltage in the second region.

20 Claims, 12 Drawing Sheets

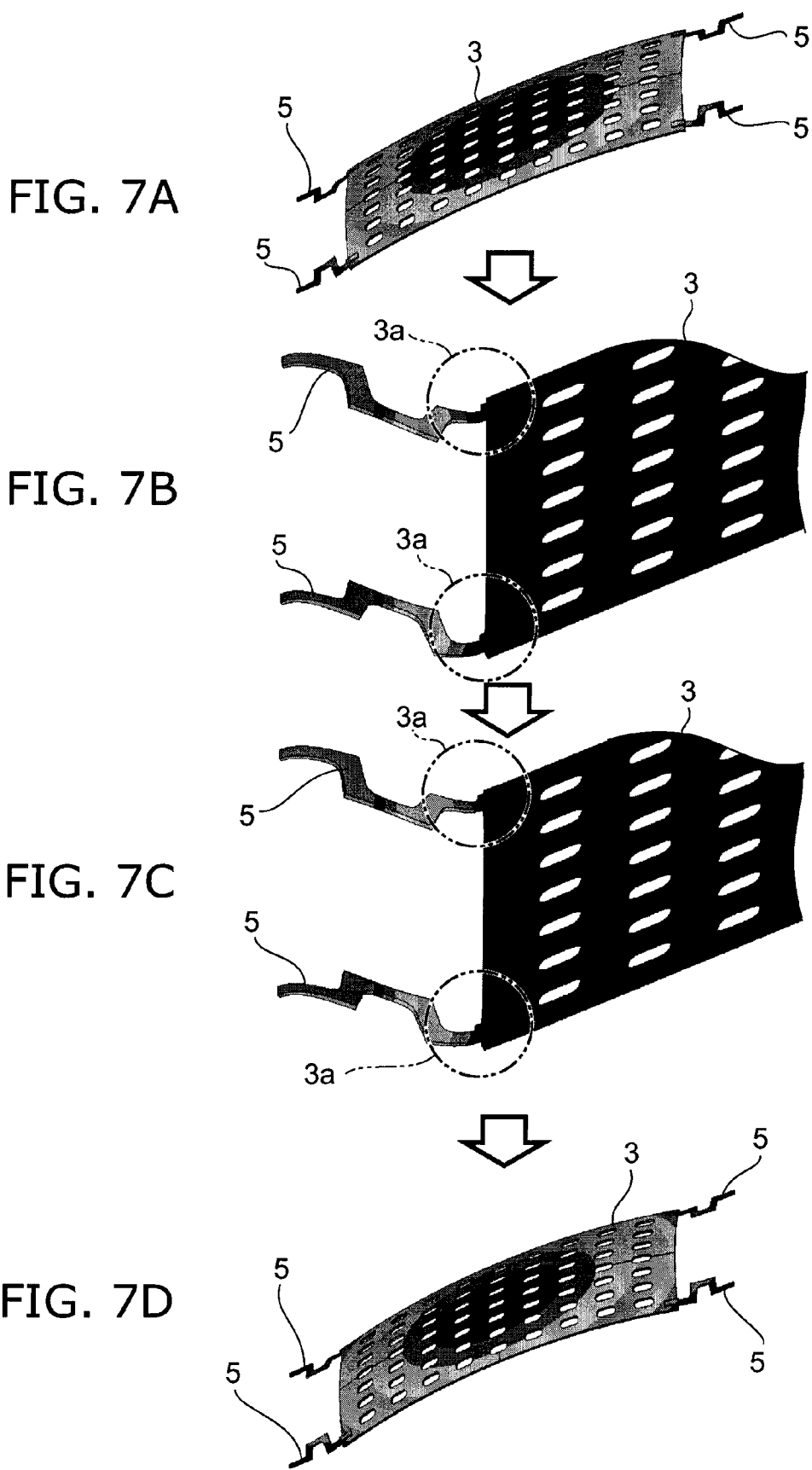

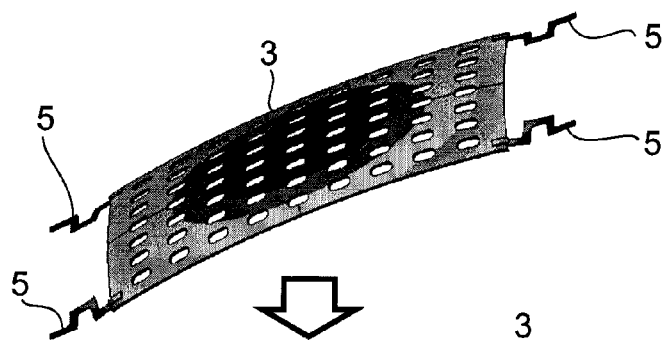
FIG. 8A
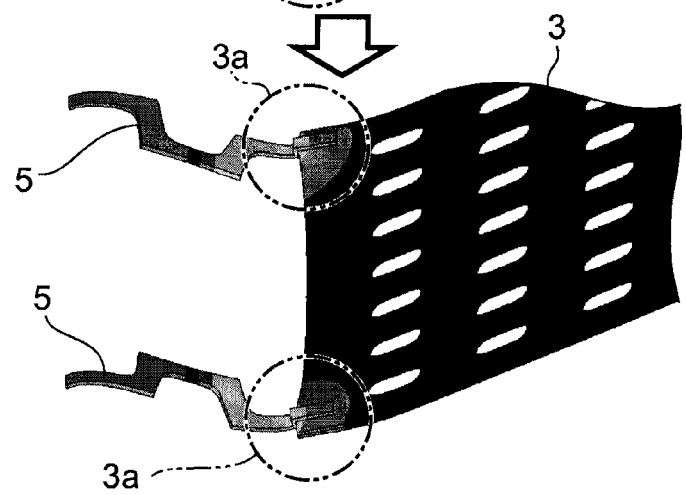
FIG. 8B
FIG. 8C
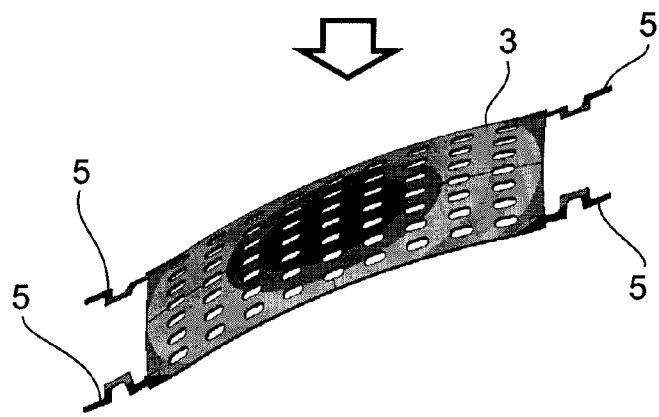
FIG. 8D

US 8,873,218 B2

ACTUATOR

CROSS-REFERENCE TO RELATED APPLICATIONS

This application is based upon and claims the benefit of priority from the prior Japanese Patent Application No. 2010-213449, filed on Sep. 24, 2010; the entire contents of which are incorporated herein by reference.

FIELD

Embodiments described herein relate generally to an actuator.

BACKGROUND

In variable capacity and switches, it is important to realize low loss, high isolation and high linearity.

For example, in high-frequency switches using an electro-statically-actuated MEMS (Micro Electro Mechanical Systems) actuator, a conductor made of aluminum (Al), silver, copper, gold or the like is used as a control conductor or a connecting conductor. However, because materials such as aluminum and gold are ductile materials, when such actuator is driven in a high stress state or under high temperatures, deformation due to creep may occur.

BRIEF DESCRIPTION OF THE DRAWINGS

FIG. 7A to FIG. 7D are schematic perspective views illustrating an example of creep analysis according to the embodiment;

FIG. 8A to FIG. 8D are schematic perspective views illustrating an example of the creep analysis according to a comparative example;

DETAILED DESCRIPTION

Figure 1A:
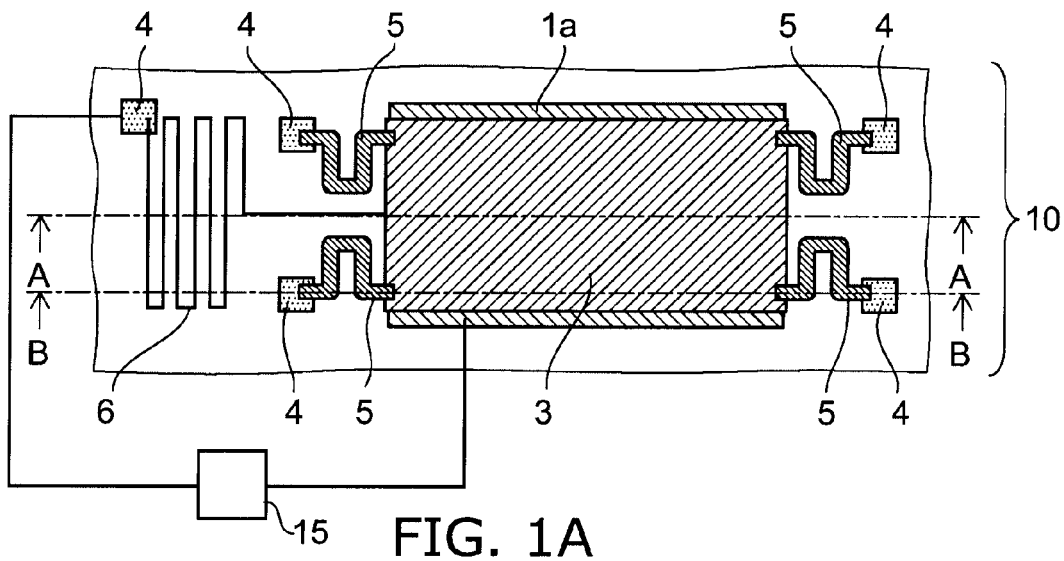
FIG. 1A to FIG. 1C are schematic views showing an actuator according to an embodiment.

In general, according to one embodiment, an actuator includes a substrate, a lower electrode disposed on the substrate, an upper electrode, a support and a driving unit. The upper electrode is opposed to the lower electrode, and a distance between the lower electrode and the upper electrode is variable. The support has one end fixed to the substrate and one other end connected to the upper electrode and supports the upper electrode. The support has a higher creep resistance than the upper electrode. The driving unit is connected between the lower electrode and the upper electrode and feeds a driving voltage applied between the lower electrode and the upper electrode. The driving voltage at which the lower electrode and the upper electrode start to come into contact with each other when an absolute value of a potential difference between the lower electrode and the upper electrode is increased is defined as a pull-in voltage. A capacitance between the lower electrode and the upper electrode when the pull-in voltage is applied is defined as a pull-in capacitance. There exist a first region and a second region. In the first region, a change rate of a capacitance ratio relative to the pull-in capacitance rapidly changes when the absolute value of the potential difference is increased to the pull-in voltage or larger. In the second region, the change rate changes more slowly than in the first region, when the absolute value of the potential difference is further increased. The driving unit feeds the driving voltage in the second region.

Various embodiments will be described hereinafter with reference to the accompanying drawings. In the drawings, similar components are given the same reference numerals and detailed description thereof is appropriately omitted.

Figure 1B:
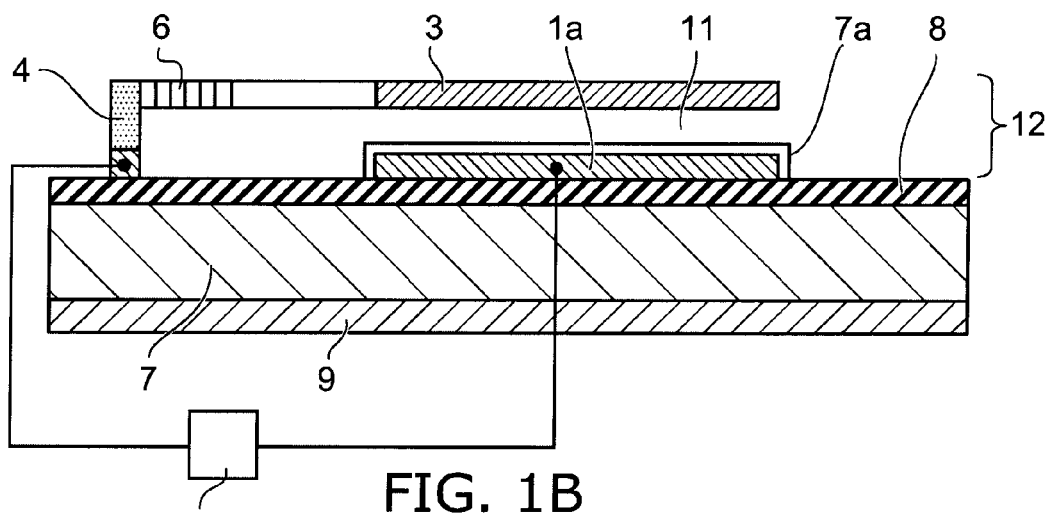
Figure 1C:
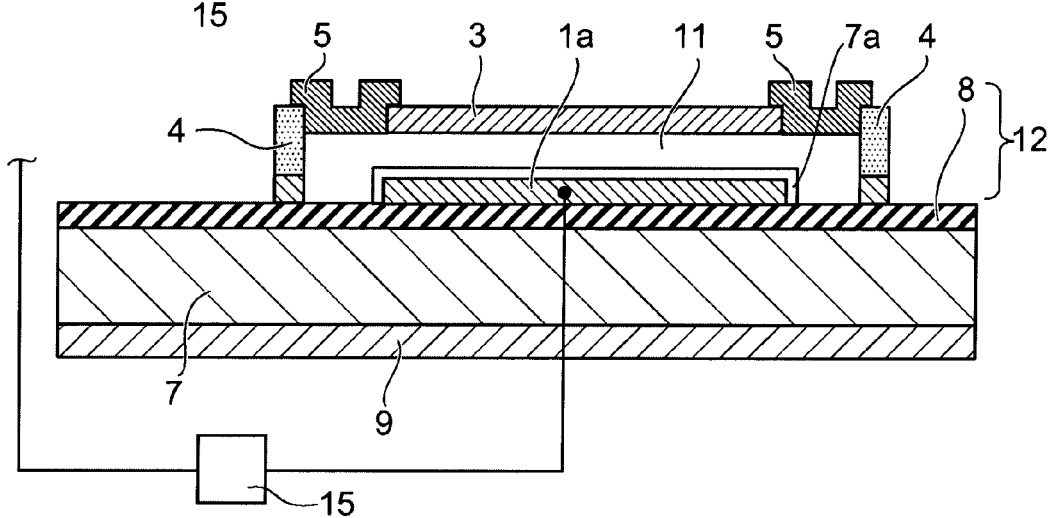

FIG. 1A to FIG. 1C are schematic views showing an actuator according to the embodiment. FIG. 1A is a schematic plane view showing the actuator according to the embodiment, FIG. 1B is a schematic end view in a cut section taken along A-A in FIG. 1A and FIG. 1C is a schematic end view in a cut section taken along B-B in FIG. 1A.

An actuator 10 according to the embodiment includes a substrate 7 formed of a silicon substrate, glass substrate or the like, an insulating film 8 formed on the substrate 7, a ground electrode 9 formed under the substrate 7, an electrostatic actuator part 12 provided on the insulating film 8 and a driving unit 15 for driving the actuator part 12.

Examples of the insulating film 8 include a silicon oxide film ($SiO_2$) or a silicon nitride film (SiN).

The actuator part 12 is a lower electrode 1a disposed on the insulating film 8 and an upper electrode 3 that is opposed to the lower electrode 1a and has a variable distance between the same and the lower electrode 1a. A spring 6 and a support 5 are connected to the upper electrode 3. A hollow part 11 is formed between the lower electrode 1a and the upper electrode 3. Thus, by driving the upper electrode 3, a value of a capacitance between the lower electrode 1a and the upper electrode 3 can be changed.

The movable upper electrode 3 is made of ductile metal such as aluminum (Al), aluminum alloy and gold (Au). The spring 6 is made of ductile metal and is softer than the support 5. The upper electrode 3 is connected to a support part 4 via the spring 6.

The term "ductility" in the specification means a property that an object can be extended without being broken even if it exceeds the limits of elasticity.

The upper electrode 3 is connected to the support part 4 via the support 5. A material for the support 5 has a lower ductility than that for the upper electrode 3 and the spring 6. Alternatively, the creep resistance of the support 5 is higher than that of the upper electrode 3 and the spring 6. The support 5 is made of, for example, a brittle material. The brittle material for the support 5 may be an insulating material such as silicon dioxide ($SiO_2$), silicon nitride (SiN) and silicon oxynitride (SiON) or a conductive material such as polysilicon, silicon, tungsten (W) and titanium aluminum (AlTi).

The term "creep resistance" in the specification means a resistance to creep deformation.

The term "brittleness" in the specification means a property that the object is broken before being greatly deformed when an external force is applied thereto.

When the support 5 is made of insulating material, the upper electrode 3 can be used as a float (floating) electrode. On the other hand, when the support 5 is made of conductive material, a voltage can be applied to the upper electrode 3 through the support 5. Hence, for example, the spring 6 can be omitted, which can save a space.

The material for the support 5 is not limited to the brittle material. The support 5 may be formed to be thicker, for example, than the spring 6 so as to be less deformable than the upper electrode 3 and the spring 6 as a whole structure.

That is, it is assumed that in the specification, the scope of "creep resistance" includes the creep resistance due to the type of material as well as the creep resistance due to shape and structure.

The support part 4 that supports the upper electrode 3 via the spring 6 is connected to the driving unit 15. Thus, the driving unit 15 can apply a bias voltage to the upper electrode 3 via the support part 4 and the spring 6. The lower electrode 1a is connected to the driving unit 15. Thus, the driving unit 15 can apply a bias voltage to the lower electrode 1a. That is, the driving unit 15 can feed a driving voltage applied between the lower electrode 1a and the upper electrode 3.

Figure 2A:
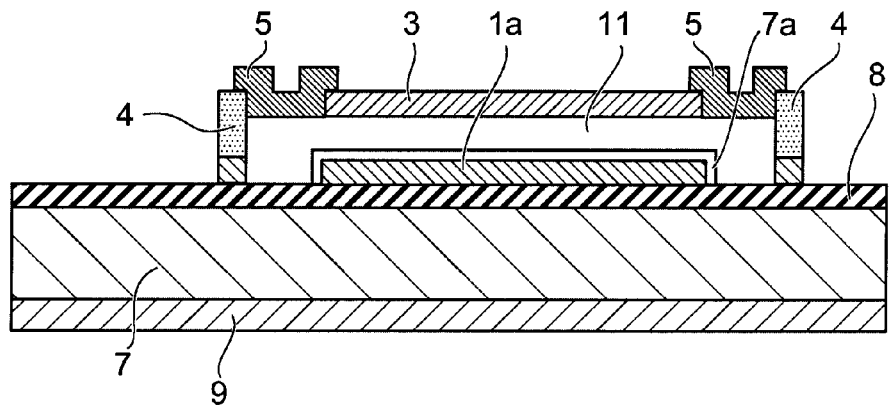
FIG. 2A to FIG. 2C are schematic end views for illustrating driving of the actuator.
Figure 2B:
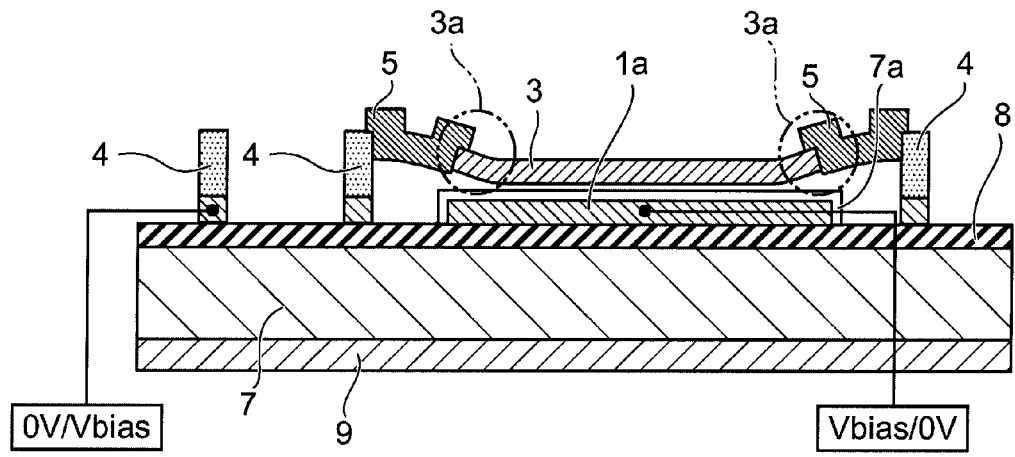
Figure 2C:
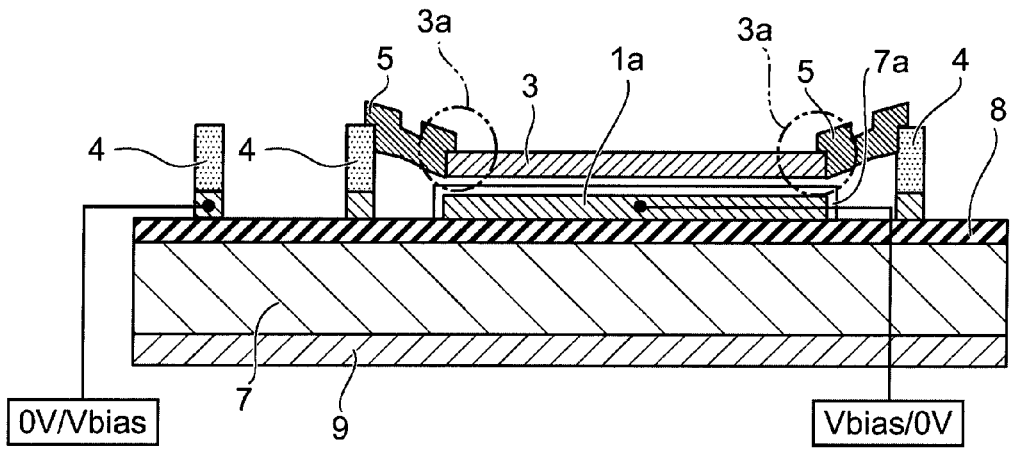

FIG. 2A to FIG. 2C are schematic end views for illustrating driving of the actuator.

FIG. 2A to FIG. 2C are schematic end views in a cut section taken along B-B in FIG. 1A.

In the state where the driving unit 15 does not apply a potential difference between the lower electrode 1a and the upper electrode 3, as shown in FIG. 2A, the upper electrode 3 is separated from the lower electrode 1a. Subsequently, when the driving unit 15 applies a potential difference between the lower electrode 1a and the upper electrode 3, the lower electrode 1a and the upper electrode 3 are attracted to each other by electrostatic attractive force. As a result, as shown in FIG. 2B, the upper electrode 3 can be driven downward. Then, the upper electrode 3 comes into contact with the lower electrode 1a via an insulating film 7a (Pull-In).

When driving the actuator part 12, the driving unit 15 applies the bias voltage to the lower electrode 1a and the upper electrode 3. For example, the driving unit 15 feeds 0 V (volt) to the upper electrode 3 and applies a voltage Vbias to the lower electrode 1a. Alternatively, for example, the driving unit 15 feeds the voltage Vbias to the upper electrode 3 and applies 0 V (volt) to the lower electrode 1a. Alternatively, the driving unit 15 may appropriately change the direction of electric field according to the number of times of driving and a capacitance value.

Here, since the upper electrode 3 is made of ductile metal as described above, when it is driven in the high stress state or under high temperatures, deformation due to creep may occur. When creep deformation occurs, a distance between the upper electrode 3 and the lower electrode 1a in an UP state becomes small. As a result, in the case of the variable capacitance, the capacitance value changes. In the case of the switch, the isolation characteristic is deteriorated.

The "UP state" in the specification means that the driving unit 15 does not apply the bias voltage to the lower electrode 1a and the upper electrode 3, and the upper electrode 3 is not in contact with the lower electrode is via the insulating film 7a.

On the contrary, in the embodiment, the upper electrode 3 made of the ductile metal is connected to the support part 4 via the spring 6 made of the ductile metal and the support 5 made of the material having a lower ductility than that for the upper electrode 3 and the spring 6. Thus, the distance between the upper electrode 3 and the lower electrode 1a in the UP state is substantially determined by the support 5.

The support 5 is less deformable than the upper electrode 3 and the spring 6, hardly causing creep deformation. Hence, even when driving for a long time is performed or driving is performed multiple times, the distance between the upper electrode 3 and the lower electrode is in the UP state is hard to change. Although the spring 6 causes creep deformation, since a spring constant of the spring 6 is smaller than that of the support 5, it hardly has an effect on the distance between the upper electrode 3 and the lower electrode 1a.

When the actuator 10 is applied to most of variable capacitances and switches, switching through a signal is required (hot switch). In this case, the upper electrode 3 is supported with a hard spring having a large restoring force. In the embodiment, the upper electrode 3 is connected to the support part 4 via the support 5 that is harder than the spring 6.

However, when the upper electrode 3 is supported by the hard spring having a large restoring force, as shown in FIG. 2B, an end 3a of the upper electrode 3 in the Down state may be pulled by the support 5 and float from the insulating film 7a. Then, a stress is exerted on the upper electrode 3 made of ductile metal. As a result, creep deformation may occur in the upper electrode 3.

The "Down state" in the specification means a state where the driving unit 15 applies the bias voltage to the lower electrode 1a and the upper electrode 3 and the upper electrode 3 is in contact with the lower electrode is via the insulating film 7a. The end 3a of the upper electrode 3 is a part connected to the support 5.

On the contrary, in the embodiment, the driving unit 15 applies a potential difference that is a pull-in voltage or larger between the lower electrode 1a and the upper electrode 3 for driving. In this case, as shown in FIG. 2C, the end 3a of the upper electrode 3 hardly floats from the insulating film 7a and becomes flat. Hence, substantially no stress is exerted on the upper electrode 3. On the other hand, a stress is focused on the support 5. As described above, the support 5 is hard to be subjected to creep deformation. This can suppress deformation due to creep.

Here, creep strain rate depends on stress and temperature and is generally expressed by a following Dorn-Woertman formula.

$$\dot{\varepsilon}_c = a \cdot \sigma^n \cdot \exp\left(-\frac{Q}{RT}\right) \quad (1)$$

In the formula (1), a constant a, a creep index n and creep activation energy Q are determined depending on material. Other conditions include an initial stress $\sigma$ and absolute temperature T. R is a gas constant.

As apparent from the formula (1), as the initial stress a is larger or the absolute temperature T is higher, the creep strain rate becomes higher. The creep strain rate also changes depending on material. It is known that the ductile metal (ex. aluminum (Al), aluminum alloy and gold (Au)) has a very high creep strain rate, while the brittle material (ex. silicon dioxide ($SiO_2$) and silicon nitride (SiN)) has a very low creep strain rate.

Hence, when the support 5 is, for example, made of the above-mentioned brittle material, the creep strain rate of the support 5 is low. In this case, when the driving unit 15 applies the potential difference that is the pull-in voltage or larger between the lower electrode 1a and the upper electrode 3, occurred stress can be focused on the support 5 having an excellent creep resistance. This can suppress deformation due to creep.

Next, relationship between a driving voltage and capacitance will be described with reference to drawings.

Figure 3A:
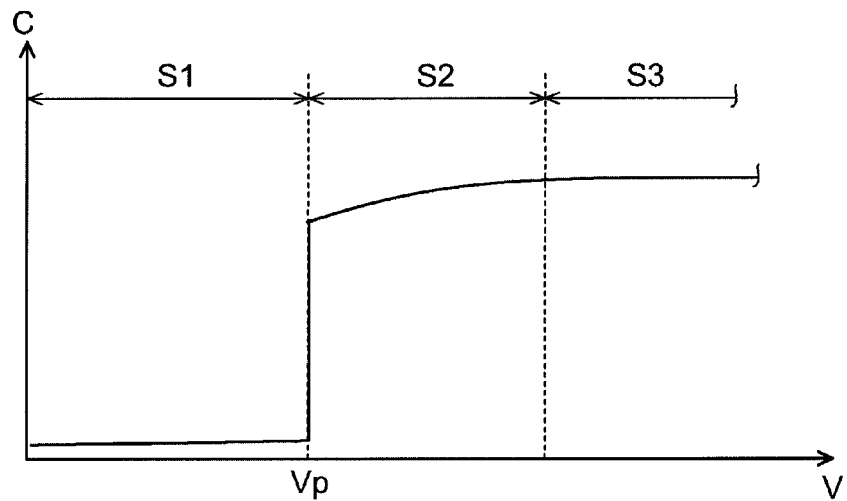
FIG. 3A and FIG. 3B are graphs showing the relationship between the driving voltage and the capacitance.
Figure 3B:
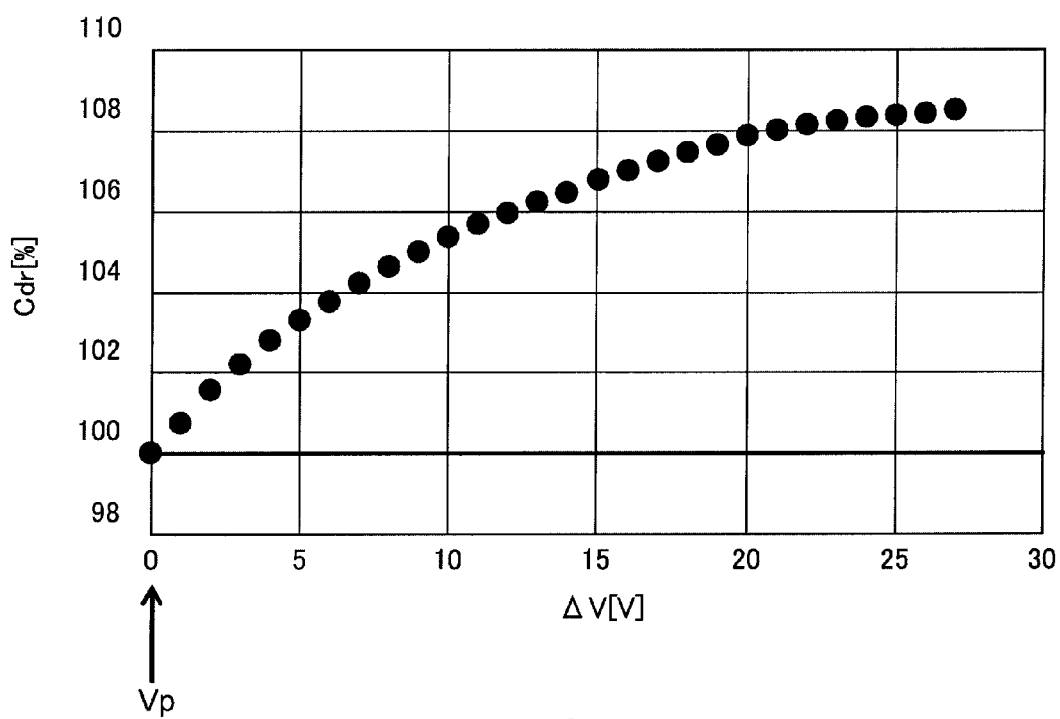

FIG. 3A and FIG. 3B are graphs showing relationship between the driving voltage and the capacitance. FIG. 3A is a graph showing an example of relationship between the driving voltage that is the pull-in voltage Vp or lower, or is the pull-in voltage Vp or higher, and the capacitance, and FIG. 3B shows an analysis result illustrating an example of relationship between the driving voltage that is the pull-in voltage Vp or higher and the capacitance. A vertical axis (capacitance) and a horizontal axis (driving voltage) in FIG. 3A each are a linear axis.

When the driving unit 15 applies the bias voltage to the lower electrode 1a and the upper electrode 3, as described above with reference to FIG. 2A to FIG. 2C, the upper electrode 3 is attracted to the lower electrode 1a. Thus, when the driving unit 15 applies the potential difference that is the pull-in voltage Vp or smaller between the lower electrode 1a and the upper electrode 3, since the distance between the upper electrode 3 and the lower electrode 1a becomes small, the capacitance slightly increases as shown in FIG. 3A (state S1).

Subsequently, when the driving unit 15 applies the potential difference that is equal to the pull-in voltage Vp between the lower electrode 1a and the upper electrode 3, the upper electrode 3 comes into contact with the lower electrode 1a via the insulating film 7a. At this time, the capacitance between the upper electrode 3 and the lower electrode is rapidly increases.

Subsequently, when the driving unit 15 applies the potential difference that is the pull-in voltage Vp or larger between the lower electrode 1a and the upper electrode 3, the capacitance between the upper electrode 3 and the lower electrode 1a gradually increases (state 2). Subsequently, when the driving unit 15 further applies the potential difference that is the pull-in voltage Vp or larger between the lower electrode 1a and the upper electrode 3, the capacitance between the upper electrode 3 and the lower electrode 1a gets closer to a saturated state (state S3). This will be further described with reference to FIG. 3B.

A horizontal axis in the graph in FIG. 3B represents a voltage $\Delta V$ (volt) further applied by the driving unit 15 using the pull-in voltage Vp as a reference. A vertical axis in the graph in FIG. 3B represents a ratio Cdr (percent) of the capacitance in the Down state in the case where the capacitance (pull-in capacitance) in the Down state at the time when the driving unit 15 applies the pull-in voltage Vp is set to "100".

As shown in FIG. 3B, as the potential difference applied by the driving unit 15 between the lower electrode 1a and the upper electrode 3 is increased, the capacitance between the upper electrode 3 and the lower electrode is gradually increases. This is due to that, as the potential difference applied by the driving unit 15 between the lower electrode 1a and the upper electrode 3 is increased, electrostatic attractive force that occurs between the lower electrode 1a and the upper electrode 3 increases, thereby improving adhesiveness and flatness between the lower electrode 1a and the upper electrode 3. At this time, the end 3a of the upper electrode 3 that is pulled by the support 5 and floats from the insulating film 7a gradually comes into contact with the lower electrode 1a via the insulating film 7a.

Then, when the driving unit 15 applies a larger potential difference between the lower electrode 1a and the upper electrode 3, the capacitance gets closer to the saturated state. This is due to that improvement of adhesiveness and flatness between the lower electrode 1a and the upper electrode 3 comes to be saturated. That is, in a certain time since the driving unit 15 feeds the potential difference that is the pull-in voltage Vp or larger (state S2), an area of the lower electrode 1a and the upper electrode 3 that are in contact with each other via the insulating film 7a rapidly increases over the electrodes from that in the state S1. When the driving unit 15 applies a larger potential difference (state S3), the area of the lower electrode 1a and the upper electrode 3 that are in contact with each other via the insulating film 7a slowly increases in a narrower region of the end 3a of the upper electrode 3 floating from the insulating film 7a from that in the state S2.

Figure 4:
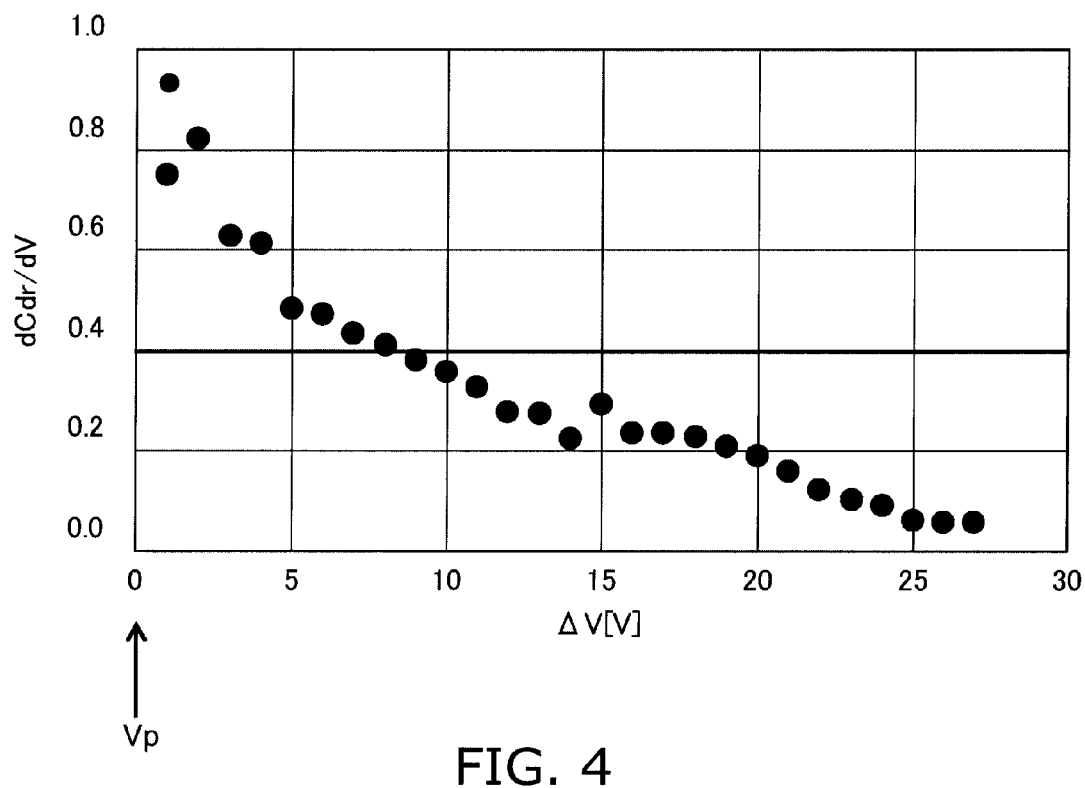
FIG. 4 shows an analysis result illustrating an example of dependency of the capacitance ratio on increase in voltage.

FIG. 4 shows an analysis result illustrating an example of dependency of the capacitance ratio on increase in voltage.

A horizontal axis in the graph in FIG. 4 is the same as that in the graph in FIG. 3B. A vertical axis in the graph in FIG. 4 represents a change rate dCdr/dV relative to a voltage of each capacitance ratio Cdr in the graph in FIG. 3B. That is, the change rate dCdr/dV in FIG. 4 represents a "gradient" in each capacitance ratio Cdr in the graph in FIG. 3B.

As shown in FIG. 4, as the potential difference applied by the driving unit 15 between the lower electrode 1a and the upper electrode 3 is increased, the change rate dCdr/dV relative to the voltage of the capacitance ratio Cdr decreases. Then, the capacitance gets closer to the saturated state. As described above with reference to FIG. 3A and FIG. 3B, this is due to that improvement of adhesiveness and flatness between the lower electrode 1a and the upper electrode 3 comes to be saturated.

When adhesiveness and flatness between the lower electrode 1a and the upper electrode 3 are improved, the end 3a of the upper electrode 3 hardly floats from the insulating film 7a and becomes flat. In this case, as described above with reference to FIG. 2A to FIG. 2C, substantially no stress is exerted on the upper electrode 3. On the other hand, the stress is focused on the support 5. The support 5 is hard to be subjected to creep deformation. Thus, in order to prevent deformation due to creep, it is preferred that the driving unit 15 applies the potential difference that is the pull-in voltage Vp or larger between the lower electrode 1a and the upper electrode 3 to drive the actuator in the state where the change rate dCdr/dV relative to the voltage of the capacitance ratio Cdr is decreased.

When the driving unit 15 applies the potential difference that is the pull-in voltage Vp or larger between the lower electrode 1a and the upper electrode 3, there exists a first region where the change rate dCdr/dV relative to the voltage of the capacitance ratio Cdr rapidly changes. Also, there exists a second region where the change rate dCdr/dV relative to the voltage of the capacitance ratio Cdr changes more slowly than in the first region. For example, as shown in FIG. 4, when the change rate dCdr/dV is more than "0.4", the change rate dCdr/dV rapidly changes (first region). On the other hand, when the change rate dCdr/dV is "0.4" or less, the change rate dCdr/dV changes more slowly as compared to the case where the change rate dCdr/dV is more than "0.4" (second region). Therefore, it is preferred that the driving unit 15 applies the potential difference between the lower electrode 1a and the upper electrode 3 so that the change rate dCdr/dV relative to the voltage of the capacitance ratio Cdr becomes "0.4" or less.

However, the number of second regions is not limited to one and may be plural. For example, in the analysis result shown in FIG. 4, when the change rate dCdr/dV is "0.2" or less, the change rate dCdr/dV changes more slowly (second region). Therefore, by applying the potential difference by the driving unit 15 between the lower electrode 1a and the upper electrode 3 so that the change rate dCdr/dV relative to the voltage of the capacitance ratio Cdr becomes "0.2" or less, deformation due to creep can be further suppressed.

Alternatively, when the change rate dCdr/dV is more than "0.6", it can be considered that the change rate dCdr/dV rapidly changes (first region). When the change rate dCdr/dV is "0.6" or less, it can be assumed that the change rate dCdr/dV changes more slowly as compared to the case where the change rate dCdr/dV is more than "0.6" (second region). Therefore, also by applying the potential difference by the driving unit 15 between the lower electrode 1a and the upper electrode 3 so that the change rate dCdr/dV relative to the voltage of the capacitance ratio Cdr becomes "0.6" or less, deformation due to creep can be suppressed.

Figure 5:
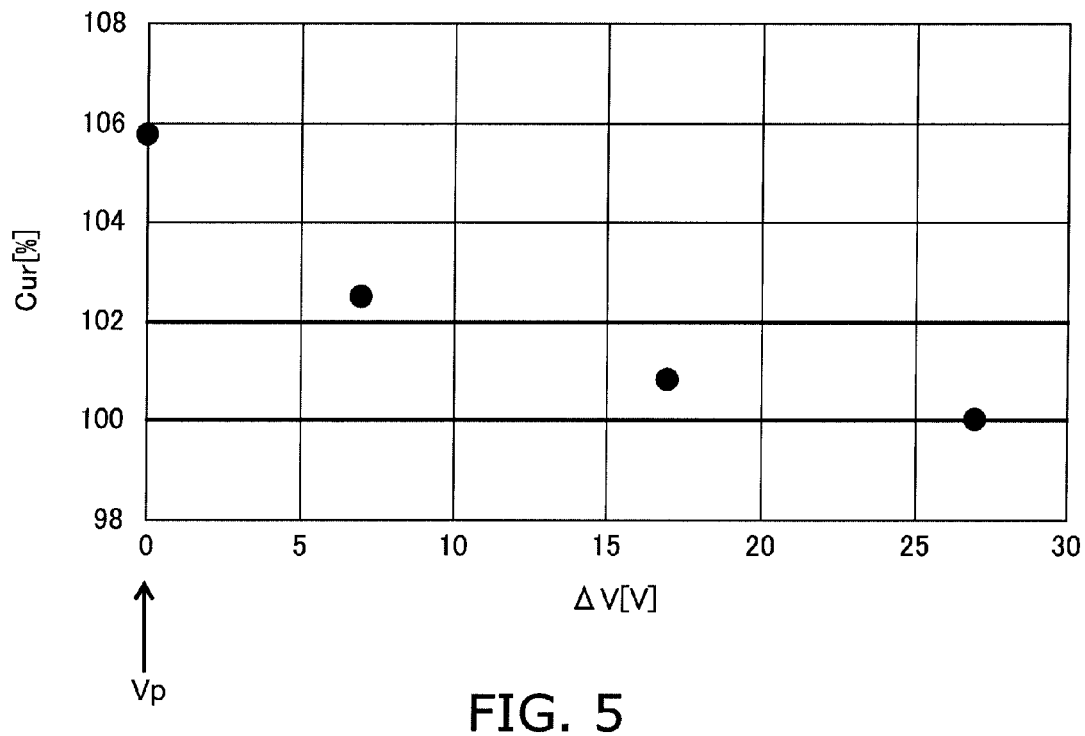
FIG. 5 shows an analysis result illustrating an example of the capacitance ratio in the UP state.

FIG. 5 shows an analysis result illustrating an example of the capacitance ratio in the UP state. A horizontal axis in the graph in FIG. 5 is the same as that in the graph in FIG. 3B. A vertical axis in the graph in FIG. 5 represents a capacitance ratio Cur (percent) in the UP state after standing in the Down state under 25° C. of room temperature for three years in the case where the capacitance in the initial UP state is set to "100". That is, the vertical axis in the graph in FIG. 5 shows the capacitance ratio Cur in the initial UP state before creep fatigue and in the UP state after creep fatigue.

As shown in FIG. 5, when the driving unit 15 applies the potential difference that is equal to the pull-in voltage Vp between the lower electrode 1a and the upper electrode 3, the capacitance in the UP state after standing in the Down state under 25° C. of room temperature for three years is larger than that in the initial UP state. This is due to that the distance between the upper electrode 3 and the lower electrode 1a is decreased by occurrence of creep deformation in the upper electrode 3. Then, as the potential difference applied by the driving unit 15 between the lower electrode 1a and the upper electrode 3 is increased, the capacitance ratio Cur in the UP state decreases. This is due to that adhesiveness and flatness between the lower electrode 1a and the upper electrode 3 are improved, thereby suppressing creep deformation of the upper electrode 3. In order to prevent deformation due to creep, it is preferred that the driving unit 15 applies the potential difference that is the pull-in voltage Vp or larger between the lower electrode 1a and the upper electrode 3 so that a difference between the capacitance ratios Cur before and after creep fatigue becomes about a few percents. For example, it is desirable that the driving unit 15 applies the potential difference between the lower electrode 1a and the upper electrode 3 so that the difference between the capacitance ratios Cur before and after creep fatigue becomes 2 percents or smaller.

Figure 6:
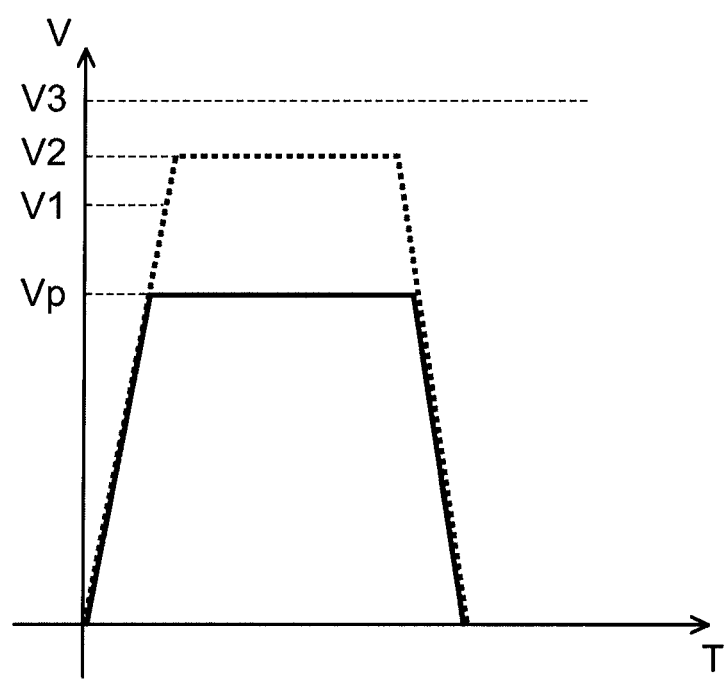
FIG. 6 is a graph illustrating an example of profile of the driving voltage in the embodiment.

FIG. 6 is a graph illustrating an example of profile of the driving voltage in the embodiment.

In the embodiment, the driving unit 15 applies the potential difference that is the pull-in voltage Vp or larger between the lower electrode 1a and the upper electrode 3 for driving. Specifically, the driving unit 15 increases the bias voltage applied to the lower electrode 1a and the upper electrode 3 and applies a voltage V2 that is a voltage V1 or higher so that the change rate dCdr/dV relative to the voltage of the capacitance ratio Cdr becomes "0.4", for example. Thereby, as described above, deformation due to creep can be suppressed. A numeral value "0.4" of the change rate dCdr/dV relative to the voltage of the capacitance ratio Cdr in the graph in FIG. 6 is merely an example, and the numeral value is not limited to "0.4". The voltage V2 is lower than a limit voltage V3 of the driving unit 15.

FIG. 7A to FIG. 7D are schematic perspective views illustrating an example of creep analysis according to the embodiment.

FIG. 8A to FIG. 8D are schematic perspective views illustrating an example of the creep analysis according to a comparative example.

FIG. 7A and FIG. 8A show the examples of the analysis results in the initial UP state, FIG. 7B and FIG. 8B show the examples of the analysis results of the Down state immediately after the driving unit 15 applies the bias voltage to the lower electrode 1a and the upper electrode 3, FIG. 7C and FIG. 8C show the examples of the analysis results of the Down state after standing in the Down state for three years, and FIG. 7D and FIG. 8D show the examples of the analysis results of the UP state after the lower electrode 1a and the upper electrode 3 that are in contact with each other via the insulating film 7a are peeled (Pull-Out).

FIG. 7B, FIG. 7C, FIG. 8B and FIG. 8C are schematic enlarged views when enlarging the end 3a of the upper electrode 3.

The analysis results shown in FIG. 7A to FIG. 7D and FIG. 8A to FIG. 8D are analysis results under 25° C. at room temperature.

In the analysis results in the comparative example in FIG. 8A to FIG. 8D, the driving unit 15 applies the potential difference that is equal to the pull-in voltage Vp between the lower electrode 1a and the upper electrode 3 for driving. In this case, as shown in FIG. 8B and FIG. 8C, immediately after application of the bias voltage and after standing in the Down state for three years, the end 3a of the upper electrode 3 is pulled by the support 5 and floats from the insulating film 7a. This may cause deformation due to creep in the end 3a of the upper electrode 3.

On the contrary, in the analysis results in the comparative example in FIG. 7A to FIG. 7D, the driving unit 15 applies the potential difference that is larger than the pull-in voltage Vp between the lower electrode 1a and the upper electrode 3 for driving. In this case, as shown in FIG. 7B and FIG. 7C, immediately after application of the bias voltage and after standing in the Down state for three years, the end 3a of the upper electrode 3 hardly floats from the insulating film 7a and becomes flat. Hence, substantially no stress is exerted on the upper electrode 3. On the other hand, the stress is focused on the support 5. As described above, the support 5 is made of a material having a lower ductility than that for the upper electrode 3 and thus, is hard to be subjected to creep deformation. This can suppress deformation due to creep.

Next, another embodiment will be described.

Figure 9A:
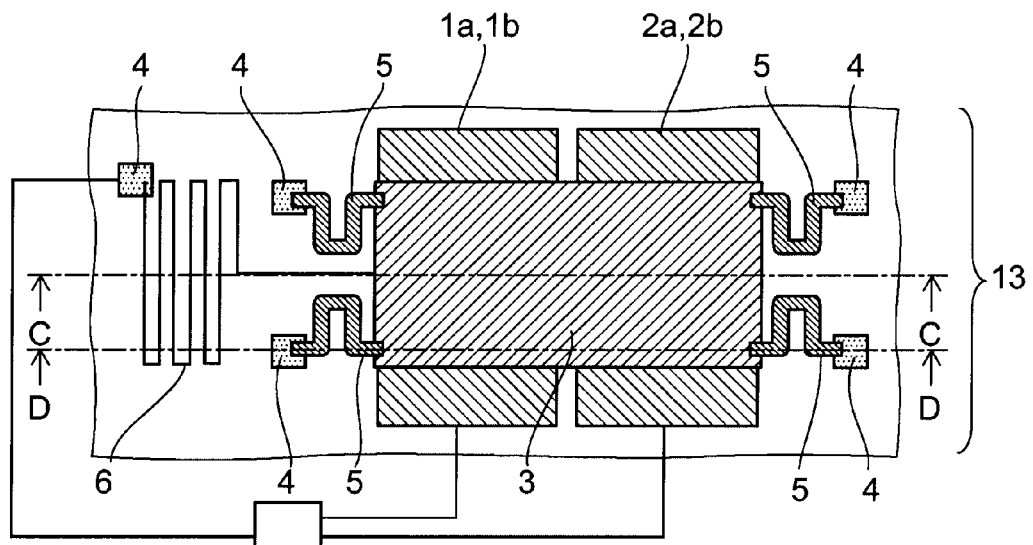
FIG. 9A to FIG. 9C are schematic views showing an actuator according to the embodiment.
Figure 9B:
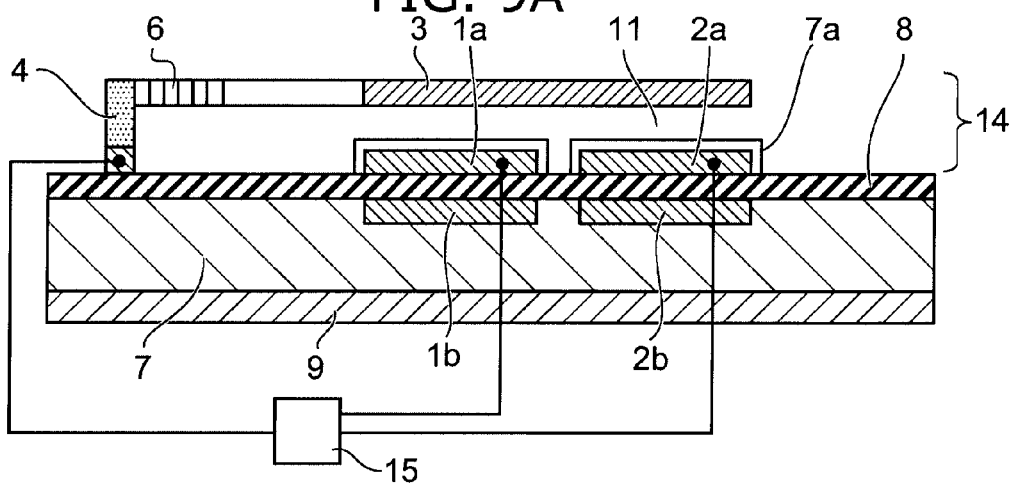
Figure 9C:
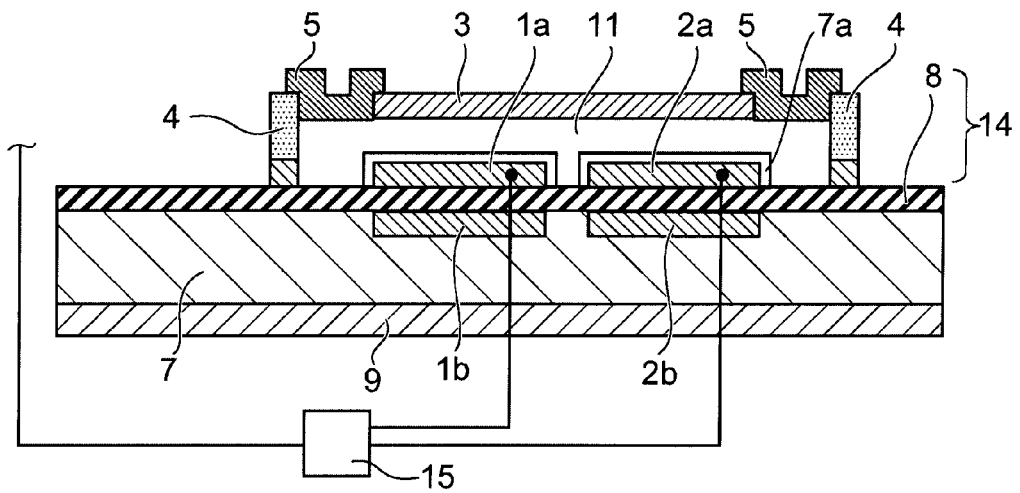

FIG. 9A to FIG. 9C are schematic views showing an actuator according to the embodiment. FIG. 9A is a schematic plane view showing the actuator according to the embodiment, FIG. 9B is a schematic end view in a cut section taken along C-C in FIG. 9A and FIG. 9C is a schematic end view in a cut section taken along D-D in FIG. 9A.

The actuator 13 according to the embodiment is used in, for example, variable capacitance. In the actuator 13 according to the embodiment, lower electrodes 1a, 2a are disposed on the insulating film 8. An RF (Radio Frequency) electrode is laminated under the lower electrodes 1a, 2a via the insulating film 8. The RF electrode has a signal line 1b provided opposed to the lower electrode 1a and a ground line 2b provided opposed to the lower electrode 2a. The upper electrode 3 is disposed as opposed to the lower electrodes 1a, 2a. A distance between the upper electrode 3 and the lower electrodes 1a, 2a is variable. The upper electrode 3 and the lower electrodes 1a, 2a constitute an electrostatic actuator part 14.

The lower electrodes 1a, 2a are connected to the driving unit 15. Thereby, the driving unit 15 can apply the bias voltage to the lower electrodes 1a, 2a. Other structure and material are the same as those of the actuator 10 described with reference to FIG. 1A to FIG. 1C.

Figure 10A:
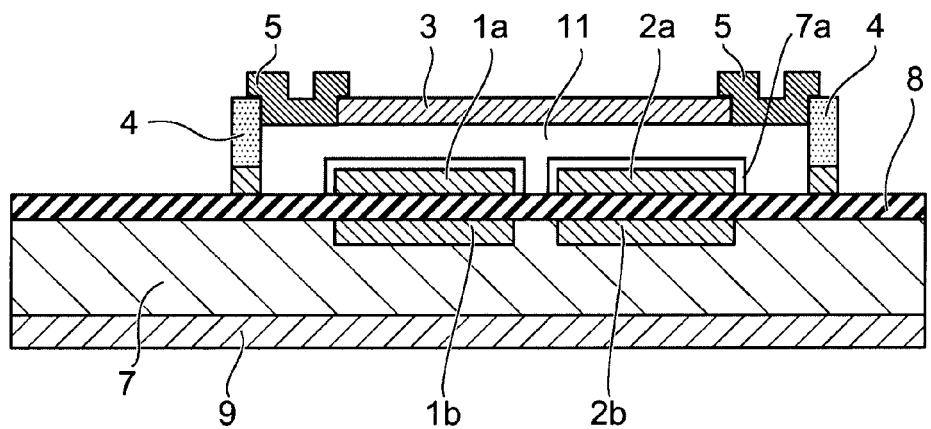
FIG. 10A to FIG. 10C are schematic end views for illustrating driving of the actuator.
Figure 10B:
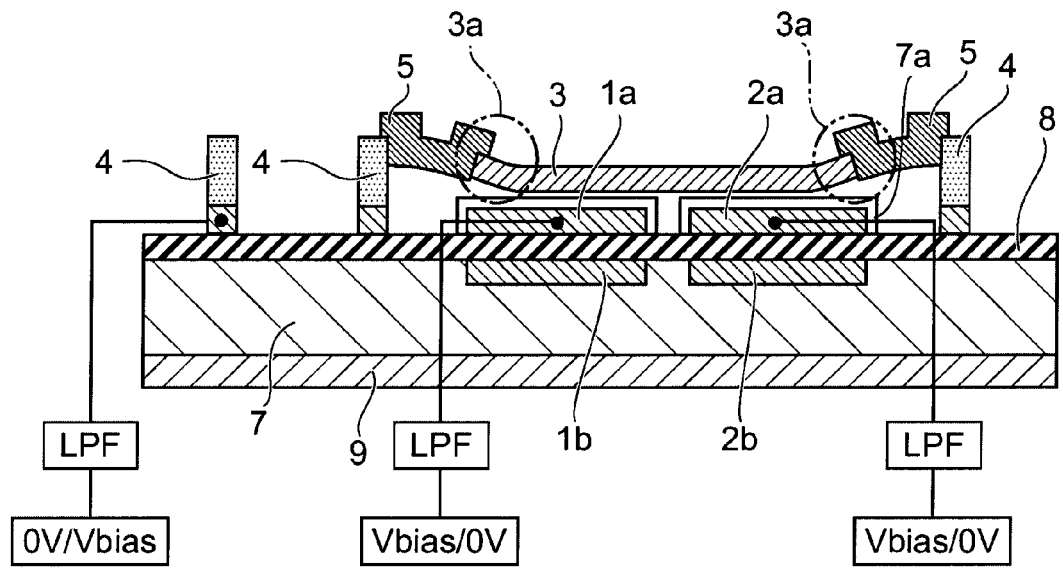
Figure 10C:
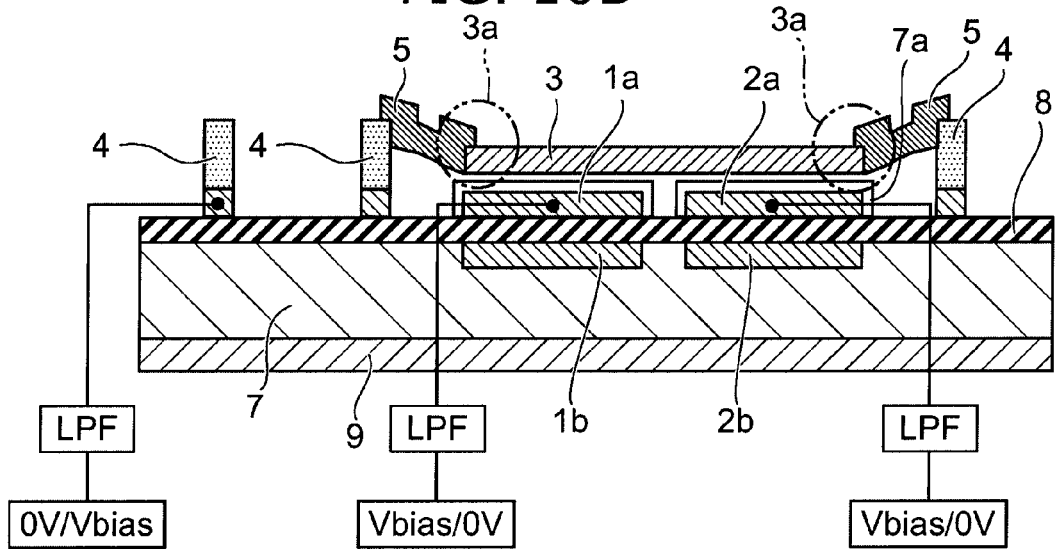

FIG. 10A to FIG. 10C are schematic end views for illustrating driving of the actuator. FIG. 10A to FIG. 10C are schematic end views in a cut section taken along D-D in FIG. 9A.

The upper electrode 3 serves as both the RF electrode and the driving electrode. As shown in FIG. 10B and FIG. 10C, since a low-pass filter (LPF) is inserted between the upper electrode 3 and the driving unit 15, the upper electrode 3 is in a floating state in terms of RF. Thereby, the upper electrode 3 can serve as both the RF electrode and the driving electrode.

When the driving unit 15 does not apply the potential difference between the lower electrodes 1a, 2a and the upper electrode 3, as shown in FIG. 10A, the upper electrode 3 is separated from the lower electrodes 1a, 2a. Subsequently, when the driving unit 15 applies the potential difference between the lower electrodes 1a, 2a and the upper electrode 3, the lower electrodes 1a, 2a and the upper electrode 3 are attracted to each other by electrostatic attractive force. Thereby, as shown in FIG. 10B, the upper electrode 3 can be driven downward. Then, the upper electrode 3 comes into contact with the lower electrodes 1a, 2a via the insulating film 7a (pull-in).

When driving the actuator part 14, the driving unit 15 applies the bias voltage to the lower electrodes 1a, 2a and the upper electrode 3 via LPF. For example, the driving unit 15 applies 0 V (volt) to the upper electrode 3 and applies the voltage Vbias to the lower electrodes 1a, 2a. Alternatively, for example, the driving unit 15 feeds the voltage Vbias to the upper electrode 3 and applies 0 V (volt) to the lower electrodes 1a, 2a. Alternatively, the driving unit 15 may appropriately change the direction of electric field depending on the number of times of driving and the capacitance value.

Also in the embodiment, the driving unit 15 applies a potential difference that is the pull-in voltage Vp or larger between the lower electrodes 1a, 2a and the upper electrode 3 for driving. In this case, as shown in FIG. 10C, the end 3a of the upper electrode 3 hardly floats from the insulating film 7a and becomes flat. Hence, substantially no stress is exerted on the upper electrode 3. On the other hand, the stress is focused on the support 5. As described above, the support 5 is hard to be subjected to creep deformation. This can suppress deformation due to creep.

The ratio Cdr of the capacitance in the Down state, the change rate dCdr/dV relative to the voltage of the capacitance ratio Cdr, the capacitance ratio Cur in the UP state and creep analysis in the embodiment are the same as described with reference to FIG. 3A to FIG. 5 and FIG. 7A to FIG. 7D.

Figure 11:
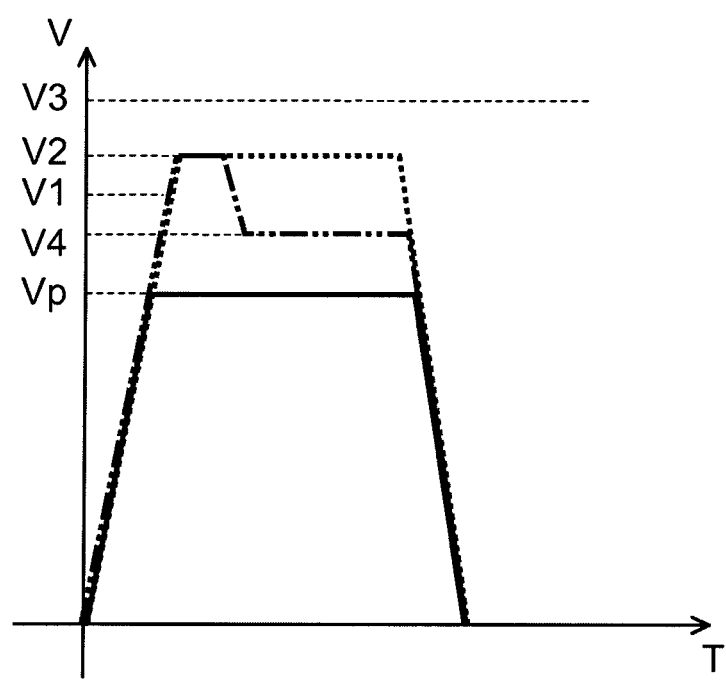
FIG. 11 is a graph illustrating an example of profile of the driving voltage in the embodiment.

FIG. 11 is a graph illustrating an example of profile of the driving voltage in the embodiment.

Generally, the electrostatic attractive force occurring between parallel flat plates depends on the driving voltage and a gap between electrodes and is expressed as a following formula.

$$F \propto \frac{V^2}{gap^2} \quad (2)$$

As apparent from the formula (2), since electrostatic attractive force depends on the driving voltage and the gap between electrodes, the driving unit 15 needs to apply a larger potential difference until the upper electrode 3 comes into contact with the lower electrodes 1a, 2a via the insulating film 7a. Once the upper electrode 3 comes into contact with the lower electrodes 1a, 2a via the insulating film 7a and adhesiveness and flatness between the lower electrode 1a and the upper electrode 3 are improved, the gap between electrodes decreases, enabling application of a larger force with a smaller potential difference.

Therefore, in the embodiment, the driving unit 15 can apply the bias voltage having the same profile as the driving voltage shown in FIG. 11 to the lower electrode 1a and the upper electrode 3. Thereby, loads of the driving unit 15 can be reduced. Moreover, power consumption can be further reduced. In addition, deformation due to creep can be suppressed.

Specifically, the driving unit 15 first increases the bias voltage applied to the lower electrode 1a and the upper electrode 3, and in the voltage increasing process, applies a first driving voltage V2 that is a voltage V1 or higher so that the change rate dCdr/dV relative to the voltage of the capacitance ratio Cdr becomes "0.4", for example. After that, the driving unit 15 decreases the bias voltage applied to the lower electrode 1a and the upper electrode 3, and in the voltage decreasing process, applies a second driving voltage V4 that is the voltage V1 or lower so that the change rate dCdr/dV relative to the voltage of the capacitance ratio Cdr becomes "0.4", for example. This also can suppress deformation due to creep.

A numeral value "0.4" of the change rate dCdr/dV relative to the voltage of the capacitance ratio Cdr illustrated in the graph in FIG. 11 is merely an example, and the numeral value is not limited to "0.4". The voltage after the driving unit 15 decreases the bias voltage applied to the lower electrode 1a and the upper electrode 3 is not limited to the voltage that is the pull-in voltage Vp or higher. The voltage V2 is lower than the limit voltage V3 of the driving unit 15.

Next, still another embodiment will be described.

Figure 12A:
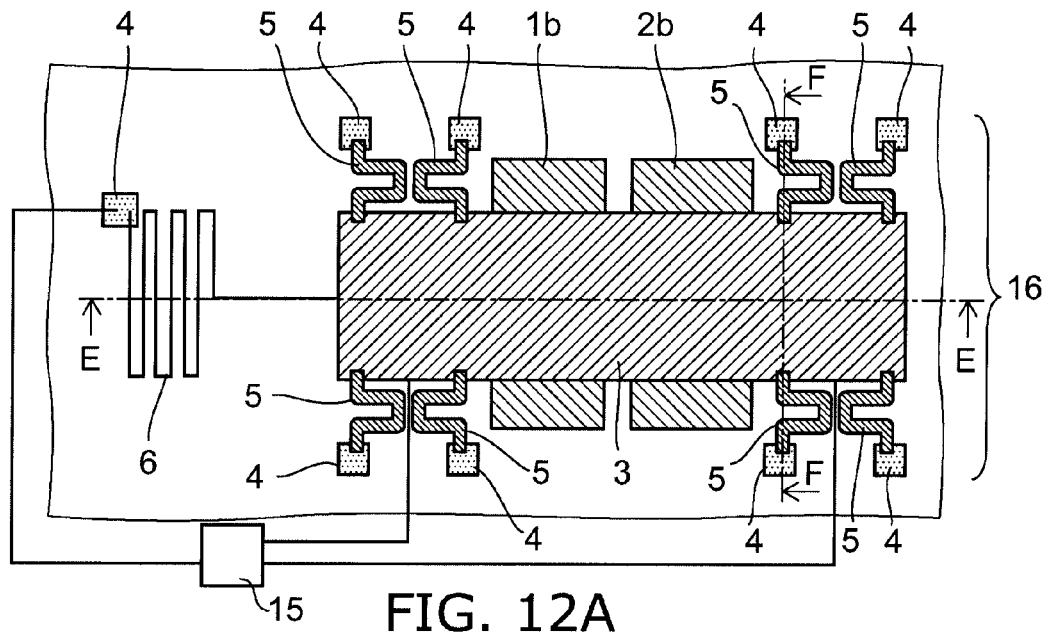
FIG. 12A to FIG. 12C are schematic views showing an actuator according to the embodiment.
Figure 12B:
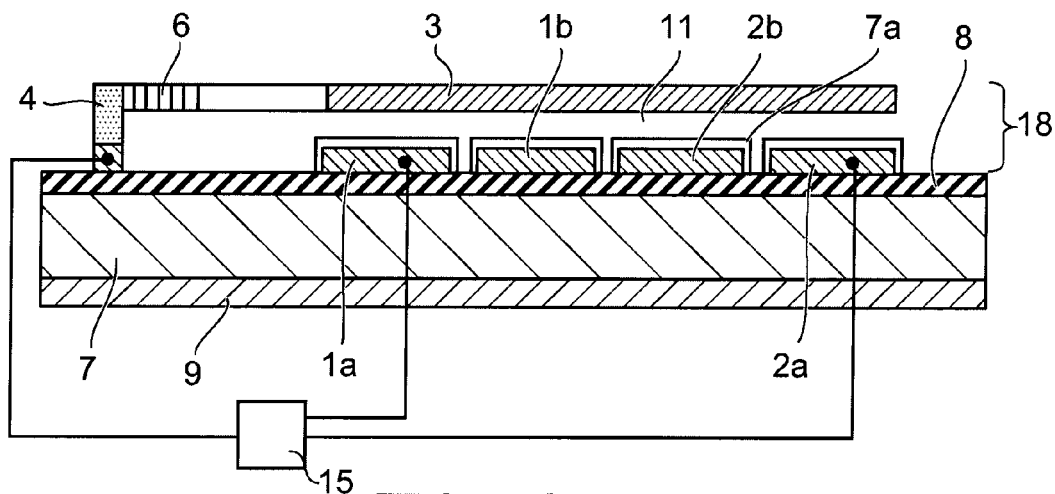
Figure 12C:
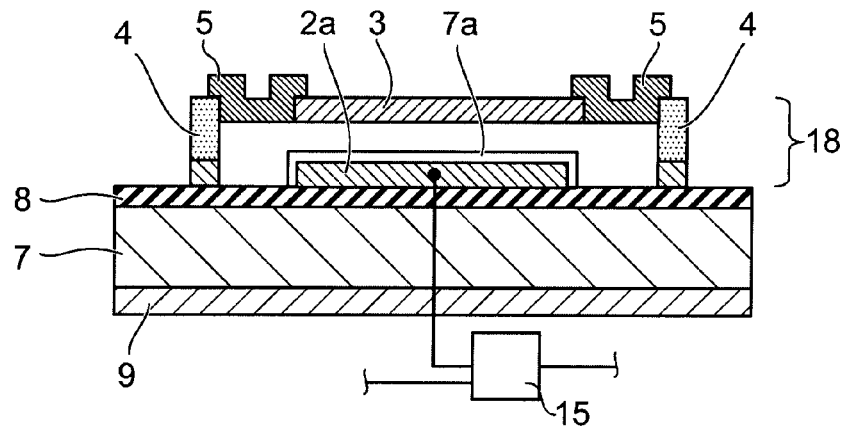

FIG. 12A to FIG. 12C are schematic views showing an actuator according to the embodiment.

FIG. 12A is a schematic plane view showing the actuator according to the embodiment, FIG. 12B is a schematic end view in a cut section taken along E-E in FIG. 12A and FIG. 12C is a schematic end view in a cut section taken along F-F in FIG. 12A.

The actuator 16 according to the embodiment is used in, for example, variable capacitance. In the actuator 16 according to the embodiment, lower electrodes 1a, 2a and the RF electrode are disposed on the insulating film 8 in parallel. The RF electrode has the signal line 1b and the ground line 2b. The signal line 1b is provided adjacent to the lower electrode 1a. The ground line 2b is provided adjacent to the lower electrode 2a. The upper electrode 3 and the lower electrodes 1a, 2a constitute an electrostatic actuator part 18. Other structure and material are the same as those of the actuator 13 described with reference to FIG. 1A to FIG. 1C.

Figure 13A:
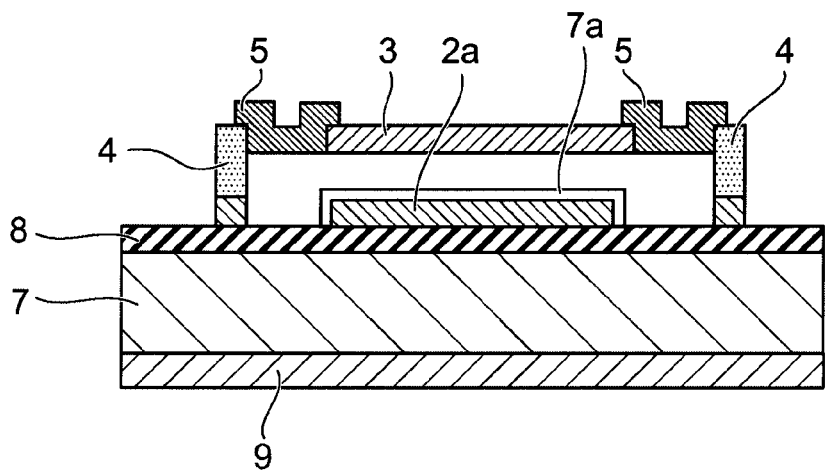
FIG. 13A to FIG. 13C are schematic end views for illustrating driving of the actuator.
Figure 13B:
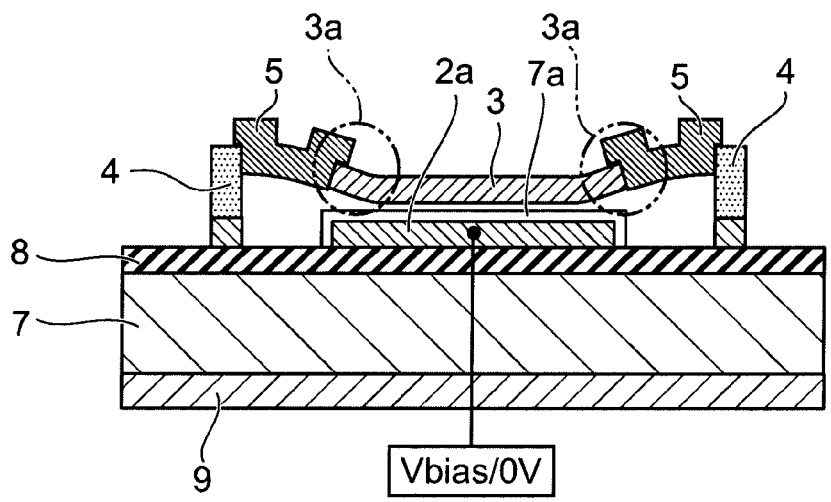
Figure 13C:
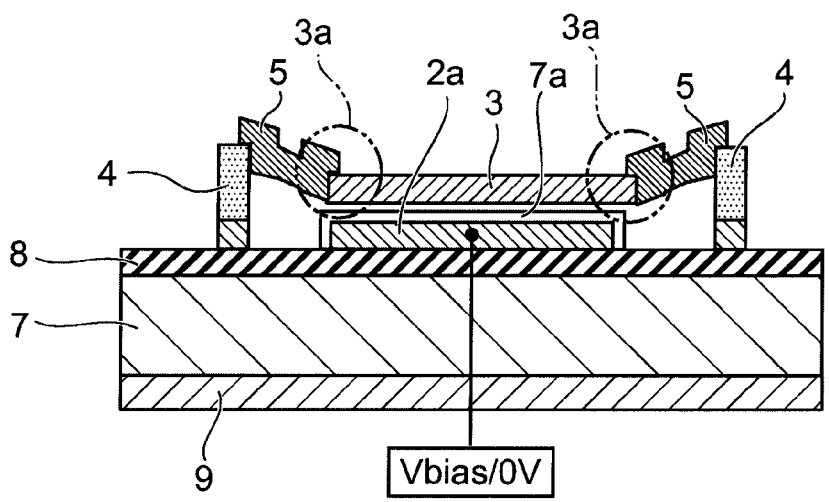

FIG. 13A to FIG. 13C are schematic end views for illustrating driving of the actuator. FIG. 13A to FIG. 13C are schematic end views in the cut section taken along F-F in FIG. 12A.

When driving the actuator part 18, as in driving the actuator 13 described with reference to FIG. 10A to FIG. 10C, the driving unit 15 applies the bias voltage to the lower electrodes 1a, 2a and the upper electrode 3 via the LPF. For example, the driving unit 15 feeds 0V (volt) to the upper electrode 3 and applies the voltage Vbias to the lower electrodes 1a, 2a. Alternatively, for example, the driving unit 15 feeds the voltage Vbias to the upper electrode 3 and applies 0V (volt) to the lower electrodes 1a, 2a. Alternatively, the driving unit 15 may appropriately change the direction of electric field depending on the number of times of driving and the capacitance value.

Also in the embodiment, the driving unit 15 applies a potential difference that is the pull-in voltage Vp or larger between the lower electrodes 1a, 2a and the upper electrode 3 for driving. In this case, as shown in FIG. 13C, the end 3a of the upper electrode 3 hardly floats from the insulating film 7a and becomes flat. Hence, substantially no stress is exerted on the upper electrode 3. On the other hand, the stress is focused on the support 5. As described above, the support 5 is hard to be subjected to creep deformation. This can suppress deformation due to creep.

The ratio Cdr of the capacitance in the Down state, the change rate dCdr/dV relative to the voltage of the capacitance ratio Cdr, the capacitance ratio Cur in the UP state and creep analysis in the embodiment are the same as described with reference to FIG. 3A to FIG. 5 and FIG. 7A to FIG. 7D. The profile of the driving voltage is the same as described with reference to FIG. 6 and FIG. 11.

The lower electrodes 1a, 2a may be separated from each other in the vicinity of a connecting part between the upper electrode 3 and the support 5. In this case, the driving unit 15 can apply the potential difference that is the pull-in voltage Vp or larger between the lower electrodes in the vicinity of the connecting part and the upper electrode 3. The same also applies to the actuator 13 described above with reference to FIG. 9A to FIG. 9C and FIG. 10A to FIG. 10C. Thus, it is possible to reduce loads of the driving unit 15 and further reduce power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An actuator comprising:
   a substrate;
   a lower electrode disposed on the substrate;
   an upper electrode opposed to the lower electrode, a distance between the lower electrode and the upper electrode being variable;
   a support having one end fixed to the substrate and one other end connected to the upper electrode, the support supporting the upper electrode, the support having a creep resistance higher than a creep resistance of the upper electrode; and
   a driving unit connected with the lower electrode and the upper electrode and being configured to supply a driving voltage between the lower electrode and the upper electrode,
   the lower electrode and the upper electrode forming a formed capacitance,
   a pull-in capacitance being the formed capacitance when a pull-in voltage is applied between the lower electrode and the upper electrode,
   the formed capacitance being configured to change in accordance with a change of an absolute value of a potential difference between the lower electrode and the upper electrode, a ratio of the formed capacitance to the pull-in capacitance changing in accordance with the change of the absolute value, a change rate of the ratio with the change of the absolute value changing in accordance with the change of the absolute value,
   the absolute value including a first region and a second region, the first region being not less than the pull-in voltage, the second region being larger than the first region,
   the change rate in the first region being higher than the change rate in the second region, and
   the driving voltage being in the second region.

2. The actuator according to claim 1, wherein the support has ductility lower than the upper electrode.

3. The actuator according to claim 1, wherein the change rate in the second region is 0.4 (1/volt) or less.

4. The actuator according to claim 1, wherein the change rate in the second region is 0.2 (1/volt) or less.

5. The actuator according to claim 1, wherein the change rate in the second region is 0.6 (1/volt) or less.

6. The actuator according to claim 1, wherein the support includes at least one of oxide, nitride and oxynitride.

7. The actuator according to claim 1, wherein the support includes at least one of silicon dioxide, silicon nitride and silicon oxynitride.

8. The actuator according to claim 1, wherein the support includes at least one of polysilicon, silicon, tungsten and titanium aluminum.

9. The actuator according to claim 1, further comprising an RF electrode disposed opposed to the lower electrode.

10. The actuator according to claim 1, further comprising an RF electrode disposed parallel to the lower electrode.

11. An actuator comprising:
    a substrate;
    a lower electrode disposed on the substrate;
    an upper electrode opposed to the lower electrode, a distance between the lower electrode and the upper electrode being variable;
    a support having one end fixed to the substrate and one other end connected to the upper electrode, the support supporting the upper electrode, the support having a creep resistance higher than a creep resistance of the upper electrode; and
    a driving unit connected between the lower electrode and the upper electrode and being configured to perform a first operation and to perform a second operation after performing the first operation,
    the driving unit being configured to supply a first driving voltage between the lower electrode and the upper electrode in the first operation, an absolute value of the first driving voltage being not less than a pull-in voltage, and
    the driving unit being configured to supply a second driving voltage between the lower electrode and the upper electrode in the second operation, an absolute value of the second driving voltage being smaller than the absolute value of the first driving voltage.

12. The actuator according to claim 11, wherein the support has ductility lower than the upper electrode.

13. The actuator according to claim 11, wherein the support includes at least one of oxide, nitride and oxynitride.

14. The actuator according to claim 11, wherein the support includes at least one of silicon dioxide, silicon nitride and silicon oxynitride.

15. The actuator according to claim 11, wherein the support includes at least one of polysilicon, silicon, tungsten and titanium aluminum.

16. The actuator according to claim 11, further comprising an RF electrode disposed opposed to the lower electrode.

17. The actuator according to claim 11, further comprising an RF electrode disposed parallel to the lower electrode.

18. The actuator according to claim 11, wherein the second driving voltage is the pull-in voltage or higher.

19. The actuator according to claim 11, wherein the second driving voltage is the pull-in voltage or lower.

20. The actuator according to claim 11, wherein the upper electrode includes at least one of aluminum, aluminum alloy and gold.

\* \* \* \* \*